Patented Apr. 12, 1932

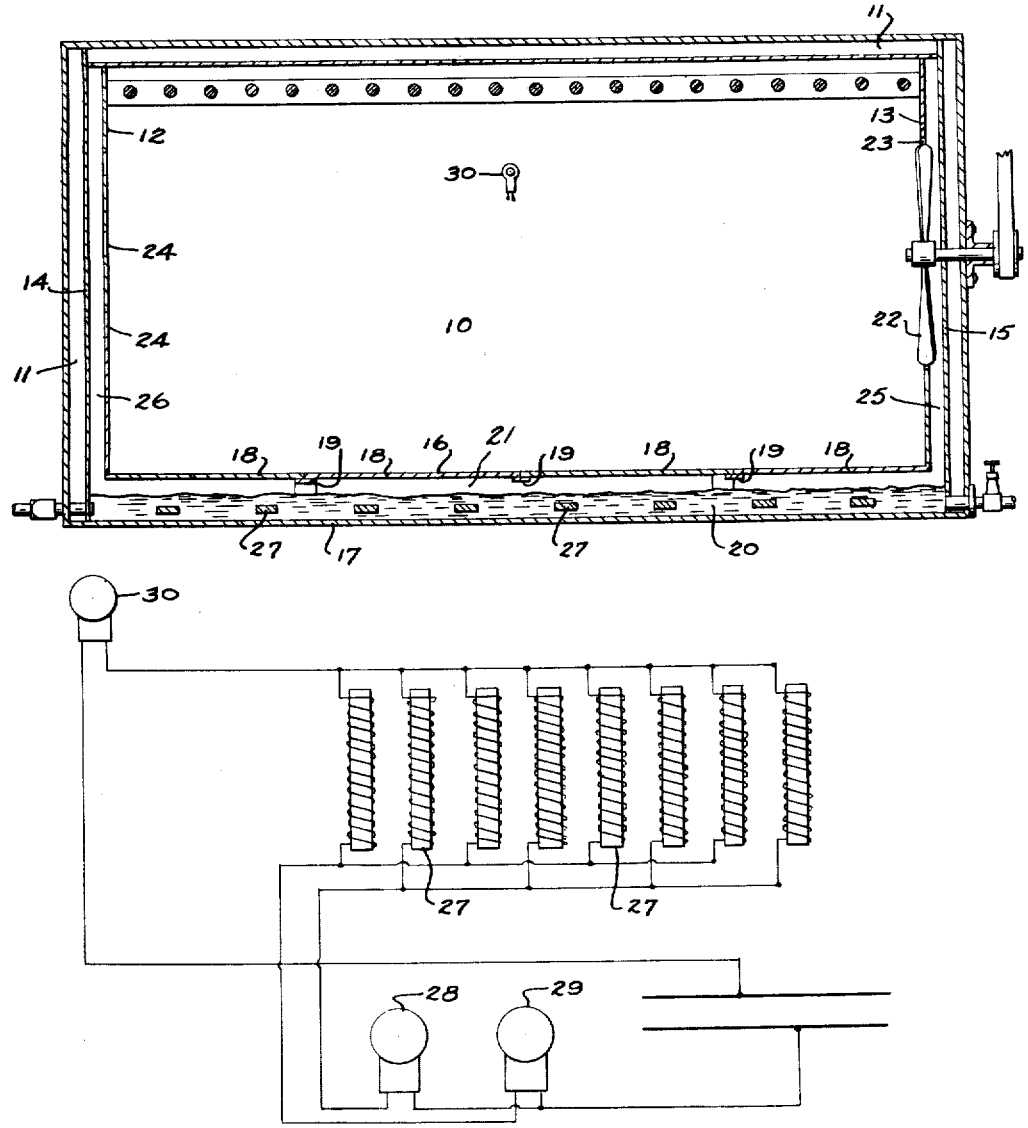

1,853,422

UNITED STATES PATENT OFFICE

GORDON D. HARRIS, OF STAMFORD, CONNECTICUT, ASSIGNOR TO THE INDUSTRIAL DRYER CORPORATION, OF STAMFORD, CONNECTICUT, A CORPORATION OF CONNECTICUT

PROCESS FOR HUMIDIFYING MATERIALS

Application filed July 9, 1927. Serial No. 204,507.

The process herein set forth may be carried out with the apparatus disclosed in my copending application Serial No. 204,157.

This invention relates generally to the art of mulling or humidifying materials and more particularly to a humidifying process in which air charged to its maximum moisture carrying capacity and at a controlled temperature is supplied to the material to be treated.

In my prior application for Letters Patent, Serial No. 81,606, filed January 15th, 1926, there is described and claimed a process for humidifying materials which comprises imparting movement to a mass of air, supplying heat units to the moving air at one stage of its travel, passing the heated air into contact with moistened surfaces in order to exchange the heat units supplied to the air for moisture, and passing the moistened air into contact with the material to be treated.

Apparatus in which the process referred to is carried into effect has gone into extensive use and has yielded satisfactory results. I have found, however, that as satisfactory or better results can be obtained and the moistened surfaces, which required frequent renewal, eliminated by making use of a mass or body of water as a heat transfer medium. The transfer of heat to the air by way of a body of water as a heat transfer medium instead of directly to the air, as in the prior application referred to, results in a simplified structure and, in addition, adds to the process a controlling or regulating factor which is an important feature of the present invention. The use of fans or similar means for circulating the air may be dispensed with, although desirable under some conditions.

In the prior application referred to, the heating means was directly exposed to the moving air stream at a point in its travel immediately before the moving stream passed into contact with the moisture supplying surfaces. With this arrangement, heat units supplied to the air by the heating means, were exchanged for moisture as the heated air made contact with the moistened surfaces. The exchange of heat for moisture units produced a drop in temperature of the air stream so that when the air had passed through the moisture supplying zone of its travel, the air was completely humidified for the temperature existing therein as it passed from the moisture supplying zone into the chamber where the material to be treated was placed. In the present invention the heating means are placed within a mass or volume of water over the surface of which the moving mass of air is caused to travel in its circulation through the system. The application of heat to the body of liquid from points within the mass brings about the travel of heated moisture units into the stream of air engaging the surface of the liquid with the result that heated water vapor units or particles pass from the volume of water into the mass of air and act to raise the temperature of the air as well as to supply moisture units thereto. This action is maintained until the temperature of the air stream has been raised to the same point as that of the mass of water and when this condition has been attained the heated air charged to its utmost capacity with the moisture content that it can sustain at that temperature passes into contact with the material to be humidified. It is not intended to convey the impression that under all conditions air and water are at exactly the same temperature, but only substantially at the same temperature.

The moisture charged air will obviously penetrate the pores of the material and deposit therein moisture, the deposition being produced by the conversion of water from the gaseous form in which it was carried by the air stream into the liquid form. The carrier air stream passes on from the vicinity of the treated material and again circulates over the heated mass of water where it is again recharged with moisture in gaseous form for a repetition of the cycle of operation.

It will be apparent that the process described permits of a close regulation and control of the temperature conditions employed. Since the temperature of the moisture charged air is the same or substantially the same as that of the mass of water from which the moisture was received, it is necessary merely to control the temperature of the mass of water to bring about corresponding control of the temperature of the moisture charged air with which the material is treated. This regulation and control of temperature conditions forms, as has been stated, an important feature of the present invention.

In order, at the beginning of an operation, to quickly bring the mass of water through which heat and moisture are supplied to the moving air stream to an effective operating temperature, supplemental heating units may be employed which may be automatically or otherwise cut out of the heating operation when the desired operating temperature has been reached. The automatic control referred to may be provided either through the use of timing mechanism or by means of a thermostatic control device. Automatic control means may also be provided for the regulation of the entire operating process both to control the temperatures used throughout the operation and to shut off the further supply of moisture when a proper condition of the material has been produced. This automatic control or regulation may be achieved in different ways.

The process described is characterized by its capability to condition materials with a high degree of efficiency which is brought about by subjecting the material to the action of a moving stream of air charged to its maximum capacity with moisture, the moisture charged air being utilized at a controlled and regulated temperature best suited to the most efficient treatment of the particular material under treatment.

Other features of the invention will be hereinafter referred to.

In the drawings, in which there is illustrated a form of apparatus adapted to carry out the process:

Figure 1 is a view in longitudinal vertical section of a humidifying arrangement adapted to be employed in the practice of the invention herein described and claimed;

Figure 2 is a diagrammatic view of an electrical circuit system adapted to be used in the practice of the invention.

Referring to the drawings for a more detailed description of the invention, a humidifying or conditioning chamber 10 is shown which is mounted within a hollow wall construction 11 to insulate the temperature conditions within the chamber from temperature conditions existing exterior thereto. The end walls 12 and 13 of the chamber 10 are spaced apart from the wall surfaces 14 and 15 of the structure 11 in order to provide vertically disposed spaces 25 and 26 which form passageways for the flow of air in the operation of the device. The floor member 16 of a chamber 10 is spaced vertically above the floor section 17 of the structure 11 and is preferably formed of removable panel members 18 supported on transversely extending strips 19. The chamber, which is thus provided beneath the floor 16 and is arranged to be supplied with water 20, includes a passageway 21 through which an air stream may flow in contact with the surface of the water 20.

In the preferred embodiment of my invention fan 22 may be provided to facilitate circulation of air through the system thus described, which fan may operate in an opening 23 formed for the purpose in the end wall 13 of the chamber. The other wall 12 of the chamber is preferably provided with air outlet ports 24 through which air forced outwardly from the chamber 10 passes downwardly through the passageway 26 and into the tunnel-like passageway 21 in contact with the upper surface of the body of water 20.

In order to produce a humidified condition of the air moving through the passage 21, heating elements 27, which may be electric resistance coils, are immersed within the body of water so as to impart heat directly thereto. The result is that water, in the form of gas, is caused to pass from the body of water 20 into the air stream in the passageway 21, thereby heating the air stream and at the same time adding moisture thereto. Thus, when the air stream emerges at the right hand end of the passageway 21, it has acquired a temperature substantially equal to the temperature of the body of water 20 and has also been humidified to the maximum extent possible for that temperature. The humidified air thus produced is immediately passed into the chamber 10 and comes into immediate contact with the material in the chamber which is to be treated.

The moisture laden air gives up its moisture to the material and, since the moisture content of the air is in the form of vapor, it penetrates into the pores and other interstices of the material so as to reach the innermost parts thereof. The air, which has lost moisture, passes from the chamber 10 through the ports 24 and again into the moisture charging passageway 21.

This cycle of operation is continued until the material in the chamber 10 has been humidified to the desired extent. For convenience the operation may be controlled by a timing means, such as the timing devices 28 and 29 each of which controls a number of the heating elements 27 in the body of water 20. With this arrangement, all the elements are turned on to initially heat the water to the desired temperature whereupon a portion of the heating elements are cut out of operation, the temperature being then maintained by the operation of the remaining elements.

In addition to the timing control of the heating elements, I may also provide a temperature control wherein a thermostat device 30 mounted within the chamber 10 operates to stop the operation of the heating coils when a predetermined maximum temperature has been reached within the chamber.

It will be seen that I have devised a method of conditioning materials which involves the use of air charged to its utmost capacity with moisture for a given temperature, the selected temperature being that best suited for the treatment of the particular material then in the treating chamber.

What I claim is:

1. A process for conditioning material comprising adding heat units to a liquid in contact with a conditioning gas at a relatively rapid rate, to raise the humidity and temperature of said gas rapidly for a predetermined time, and then supplying heat units at a slower rate and then passing the gas in contact with material to be conditioned.

2. A process for conditioning material comprising automatically adding heat units to a liquid in contact with a conditioning gas at a relatvely rapid rate for a definte time interval, to raise the humidity and temperature of said gas rapidly, and then supplying heat units at a slower rate and then passing the gas in contact with the material to be conditioned.

3. A process for conditioning material comprising automatically adding heat units to a liquid in contact with a conditioning gas at a relatively rapid rate for a predetermined time, to raise the humidity and temperature of said gas rapidly, and then supplying heat units at a slower rate and automatically cutting off the addition of heat units to the liquid when the temperature passes a predetermined maximum and passing the gas in contact with material to be treated.

4. A method of conditioning material comprising passing a conditioning gas in contact with a body of water, supplying a maximum amount of heat to the water for a predetermined time, reducing the supply of heat to the water and passing the conditioned gas over material to be treated.

5. A method of treating materials to effect the assimilation of a definite quantity of water therein comprising circulating a gas in a closed circuit in contact with the material and a body of water, heating the body of water at a rapid rate for a predetermined time to rapidly generate water vapor to saturate the air and heat the same, subsequently reducing the rate of heating of the body of water, and continuing the heating for a predetermined time minimum sufficiently extensive to effect the assimilation of a definite quantity of water in the material.

6. A method of treating materials to effect the assimilation of a definite quantity of water therein comprising circulating a gas in a closed circuit in contact with the material and a body of water, heating the body of water at a rapid rate for a predetermined time to rapidly generate water vapor to saturate the air and heat the same, subsequently reducing the rate of heating of the body of water, continuing the heating for a predetermined time minimum sufficiently extensive to effect the assimilation of a definite quantity of water in the material, and regulating the heating at all stages so as to prevent the temperature of the gas exceeding a predetermined point.

7. A process of conditioning material comprising moving a gas along the surface of a body of liquid, heating the liquid at a rapid rate for a definite time to heat the gas to substantially the temperature of the liquid and to substantially saturate the gas with vapor, subsequently heating the liquid at a reduced rate to maintain the gas at substantially the temperature of the liquid, and causing the saturated heated gas while saturated with vapor, to flow over material to be treated, the heating of the gas being effected solely by heat transferred from the body of liquid.

8. A process for conditioning material comprising circulating a gas in a closed circuit including a conditioning zone and a zone containing the material to be treated, passing the gas over the surface of a body of liquid, heating the liquid rapidly for a predetermined time by thermal units added to the liquid below the surface thereof to effect vaporization of the liquid, and to effect substantially complete saturation of the gas with the vapor, supplying heat to the liquid at a slower rate, and continuing the recycling of the gas over the surface of the liquid and through the zone containing the material for a period of time prolonged sufficiently to raise the temperature of the gas substantially to the temperature of the liquid body and during this continuous passage supplying additional quantities of vaporized liquid to the gas so as to insure substantially complete saturation of the gas, and in each cycle passing the heated and substantially completely saturated gas to the conditioning zone and without any positive diminution in temperature or humidity, and contacting the material to be treated with the substantially completely saturated gas in the conditioning zone.

9. A process of conditioning material comprising circulating a gas in a closed circuit including a conditioning zone and a zone containing material to be treated, passing the gas horizontally over the surface of a liquid in the conditioning zone, the surface area of which is relatively large compared to its total volume, applying heat at a rapid rate to the liquid beneath the surface for a sufficient time to effect vaporization of the liquid and to effect substantially complete saturation of the gas with the liquid vapor, and to bring the temperature of the gas to substantially the temperature of the liquid, passing the gas while substantially completely saturated with liquid vapor into the zone containing the material to be treated and in contact with the material, cyclically containing the passage of the gas over the surface of the liquid and
5 through the zone containing the material to be treated, and after heating the liquid at a rapid rate for a sufficient time, continuing the heating at a reduced rate to maintain the gas and liquid during operation at substantially the
10 same temperature and to supply additional quantities of liquid vapor to the gas to maintain it in a substantially completely saturated condition.

GORDON D. HARRIS.

CERTIFICATE OF CORRECTION.

Patent No. 1,853,422.   Granted April 12, 1932, to

GORDON D. HARRIS.

It is hereby certified that error appears in the printed specification of the above numbered patent requiring correction as follows: Page 4, line 3, claim 9, for the word "containing" read continuing; and that the said Letters Patent should be read with this correction therein that the same may conform to the record of the case in the Patent Office.

Signed and sealed this 21st day of June, A. D. 1932.

(Seal)

M. J. Moore,
Acting Commissioner of Patents.

with liquid vapor into the zone containing the material to be treated and in contact with the material, cyclically containing the passage of the gas over the surface of the liquid and through the zone containing the material to be treated, and after heating the liquid at a rapid rate for a sufficient time, continuing the heating at a reduced rate to maintain the gas and liquid during operation at substantially the same temperature and to supply additional quantities of liquid vapor to the gas to maintain it in a substantially completely saturated condition.

GORDON D. HARRIS.

CERTIFICATE OF CORRECTION.

Patent No. 1,853,422.                      Granted April 12, 1932, to

GORDON D. HARRIS.

It is hereby certified that error appears in the printed specification of the above numbered patent requiring correction as follows: Page 4, line 3, claim 9, for the word "containing" read continuing; and that the said Letters Patent should be read with this correction therein that the same may conform to the record of the case in the Patent Office.

Signed and sealed this 21st day of June, A. D. 1932.

(Seal)

M. J. Moore,
Acting Commissioner of Patents.

CERTIFICATE OF CORRECTION.

Patent No. 1,853,422. Granted April 12, 1932, to

GORDON D. HARRIS.

It is hereby certified that error appears in the printed specification of the above numbered patent requiring correction as follows: Page 4, line 3, claim 9, for the word "containing" read continuing; and that the said Letters Patent should be read with this correction therein that the same may conform to the record of the case in the Patent Office.

Signed and sealed this 21st day of June, A. D. 1932.

(Seal)

M. J. Moore,
Acting Commissioner of Patents.